Patented Oct. 12, 1954

2,691,609

UNITED STATES PATENT OFFICE 2,691,609

POLYMERIC STYRENE-MALEAMIC ACID AND MALEAMATE COMPOSITIONS AND LAMINATES

Harold H. Snyder, Wilmington, Del., assignor to E. I. du Pont de Nemours and Company, Wilmington, Del., a corporation of Delaware No Drawing. Application February 2, 1951, Serial No. 209,201

3 Claims. (Cl. 154—43)

This invention relates to compositions comprising polymers selected from the group consisting of polymeric ammonium styrene-maleamate and polymeric styrene-maleamic acid, to process for producing such compositions, and to processes and articles employing such compositions as adhesives. It is more particularly directed to adhesive compositions comprising a polymer selected from the group consisting of polymeric ammonium styrene-maleamate and polymeric styrene-maleamic acid, said polymer having an absolute viscosity, when dispersed in water and adjusted to pH 7.8 with ammonia to give a 15% solids content, of at least 4700 centipoises but not more than 10,000 centipoises measured at 25° C. The invention is further directed to compositions comprising a polymer selected from the group consisting of polymeric ammonium styrene-maleamate and polymeric styrene-maleamic acid, an auxiliary adhesive and a finely divided carrier. Still further, the invention is concerned with methods for producing weatherproof joined structures comprising adhesively uniting two or more component parts with compositions comprising a polymer selected from the group consisting of polymeric ammonium styrene-maleamate and polymeric styrene-maleamic acid, and to the weatherproof structures so produced.

According to the present invention, it has been found that if a composition comprising a polymer selected from the group consisting of polymeric ammonium styrene-maleamate and polymeric styrene-maleamic acid, said polymer having an absolute viscosity, when dispersed in water and adjusted to pH 7.8 with ammonia to give a 15% solids content, of at least 4700 centipoises but not exceeding 10,000 centipoises measured at 25° C., is dissolved in water or dilute ammonia, there is produced a liquid, fast setting adhesive which, when used to unite adhesively two or more cellulosic plies, gives a multi-ply structure having remarkable weather-proofness.

The polymers which can be employed in the compositions of my invention have the recurring structure

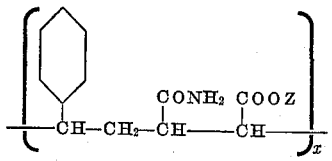

wherein Z represents a member of a group consisting of hydrogen and the ammonium radical.

It will be understood that the polymers of my novel compositions include not only polymeric styrene-maleamic acid and its full ammonium salt (polymeric ammonium styrene-maleamate) but also various partially neutralized polymeric styrene-maleamic acids.

The new products of this invention are produced by ammoniating a styrene-maleic anhydride copolymer having an absolute viscosity of at least 800 centipoises when dissolved at 15% solids concentration in methyl ethyl ketone at 25° C. Minor amounts of two other polymeric materials, namely, ammonium styrene-maleate and styrene-maleimide, may also be produced during the ammoniating process described more fully hereinafter. The presence of these side products in the compositions of my invention in the amounts produced by the ammoniation processes of the invention does not affect deleteriously the liquid adhesives prepared from said compositions.

It is preferred that the styrene-maleic anhydride copolymers used in the process of preparing the polymeric styrene-maleamic acid and its ammonium salt should be of the high viscosity type, and must of necessity have an absolute viscosity of at least 800 centipoises and preferably not exceeding 15,000 centipoises measured as a 15% solution in methyl ethyl ketone at 25° C.

In order to secure copolymers in the viscosity range mentioned above, it is essential that the temperature of polymerization is controlled and that specific amounts of polymerization initiators are employed. Preferably oxygen and other polymerization inhibitors should be excluded from the system. These and other reaction conditions which affect the viscosity or molecular weight of the copolymers are well understood by those skilled in the art of vinyl polymerization.

A preferred method for preparing styrene-maleic anhydride copolymers suitable for subsequent ammoniation in accordance with my invention is found in the copending application of Ralph Aarons, Max T. Goebel and James H. Werntz, Serial No. 182,642, filed August 31, 1950.

Substantially equimolecular amounts of styrene and maleic anhydride are dissolved in benzene to form a 10% total monomer concentration. The resulting solution is heated under a nitrogen blanket at reflux temperatures employing from 0.01 to 1.0% based on the monomer, of benzoyl peroxides as a polymerization initiator. Polymerization is essentially complete in a period of from one to two hours. The styrene-maleic anhydride copolymer which has separated during the polymerization can be filtered off and washed with benzene or petroleum ether, or it can be ammoniated in situ.

The styrene-maleic anhydride copolymers prepared by the process described above are ammoniated to produce the novel compositions of the invention by processes which comprise treating the copolymer with ammonia in an amount at least 1.1 times the quantity theoretically necessary to produce the full ammonium salt.

A preferred method of carrying out the ammoniation comprises the steps of suspending the styrene-maleic anhydride copolymer in a liquid aromatic hydrocarbon such as benzene, toluene or xylene and passing gaseous ammonia through the stirred suspension for a period of about one hour. The polymeric product so prepared is separated by filtration and allowed to dry at ordinary temperatures.

It is preferred that the ammonium salts of polymeric ammonium styrene-maleamic acid employed in my novel adhesives should be of the high viscosity type. In other words, an aqueous solution of the polymer at pH 7.8 having a 15% solids content should have a viscosity of at least 4700 centipoises at 25° C., as determined with an Ostwald pipette. Ordinarily, ammonium salts of polymeric styrene-maleamic acid which give such solutions having a viscosity of between 5000 and 9000 centipoises will give excellent results, but those having viscosities up to 10,000 centipoises may also be used.

In compositions containing an amylaceous substance, it is preferred to use a polymer selected from the group consisting of polymeric ammonium styrene-maleamate and polymeric styrene-maleamic acid, which, when dissolved to give an aqueous solution at pH 7.8 and 15% solids content, has an absolute viscosity of from 4700 to 6000 centipoises measured at 25° C. For compositions containing clay as a finely divided carrier, polymers in the high viscosity range (above 6000 centipoises) are necessary for maximum weatherproofness. Polymers in the immediate viscosity range, say, for example, 5500 centipoises, are preferred for compositions containing both clay and an amylaceous substance.

It will be understood that the viscosity of the novel adhesive compositions vary with the solids content. In turn, the concentration of solids will depend in any particular instance on the use to which the adhesive is to be applied. In general, the solids content is about from 8 to 30%. Preferably, the solids content is adjusted to that value within the range of 18 to 24% which will give the viscosity desired for the purpose on hand.

Where desired, the novel compositions of this invention contain in addition to polymeric styrene-maleamic acid and/or its ammonium salt, a finely divided carrier and a supplementary adhesive, such as an amylaceous substance, polyvinyl alcohol alone or mixed with bitumen and polyvinyl acetate.

Examples of finely divided carriers suitable for use in this invention include calcium carbonate, zinc oxide, barium sulfate, gypsum, pumice, diatomaceous earth, inorganic phosphates, antimony oxide, talc, lithopone, clay, and chalk. The solid carriers or fillers should be inert.

The average particle of the carrier should be small enough to form a smooth, homogeneous mixture with water. Extreme fineness of particles is desirable in that it facilitates dispersion of the carrier in water and gives the lowest settling rate. A particle diameter of about 5 to 10 microns is particularly preferred.

The inert finely divided solid carriers are used to extend the adhesive composition and thereby lowers its cost. In addition, in some cases, they improve the operating characteristics of the adhesive. Carriers will ordinarily comprise less than 70% by weight of the solids content of the adhesive composition.

The adhesives used in conjunction with polymeric styrene-maleamic acid and its ammonium salts in the compositions of the present invention may be of such a character as those heretofore employed in adhesive compositions. A particularly preferred adhesive is polyvinyl alcohol. Ordinarily, it will be found desirable to use the ammoniated styrene-maleic anhydride copolymer in an amount about one-tenth that of the polyvinyl alcohol. The resulting composition is characterized by having improved tack.

In compositions comprising a polymer selected from the group consisting of polymeric ammonium styrene-maleamate and polymeric styrene-maleamic acid and an amylaceous substance and optionally a finely divided carrier, it is preferred to include an effective small amount of a preservative, i. e., an agent which prevents the growth of fungi or bacteria in starch. Any preservative which is compatible with the adhesive and does not alter its physical characteristics may be used. Among the effective agents are sodium pentachlorophenate, dodecyldimethylbenzylammonium chloride, zinc or iron dimethyldithiocarbamate, tetramethylthiuram disulfide, salicylanilide, phenylmercury oleate, phenol and cresols. Sodium pentachlorophenate is preferably used in the form of a commercial material available on the open market from the Dow Chemical Company under the trade name "Dowicide G." The amount of such an agent used advantageously may be from 0.01 to 2.0% by weight in the dry composition.

In preparing a liquid adhesive from a dry composition comprising polymeric styrene-maleamic acid or a partial or neutral ammonium salt thereof, the composition can be cooked with water in the presence of minor amounts of ammonia to the concentration desired. By minor amounts of ammonia, I mean an amount not greater than 8% NH$_3$ by weight of the dry weight of the polymeric styrene-maleamic acid.

For the majority of adhesive applications, the compositions of the invention are applied in aqueous form on one or possibly both of the surfaces to be joined. The bond is then made by placing the surfaces rapidly in intimate contact with each other, preferably with some pressure. In cases of corrugated paper articles, it is usually preferable to apply some heat. Preliminary drying, however, is not always necessary nor is the use of heat and pressure always required, particularly in the bonding of porous surfaces.

In some instances the application of moderate heat after drying will give increased bond strength, especially in the bonding of non-porous surfaces. Such methods have been worked out for applying the aqueous solutions in production and for improving the bonding action on specific surfaces. The manner of removing water can, for instance, be any method adapted to the particular situation. For example, in laminating paper board water is instantaneously removed by diffusion in the paperboard members which are being joined followed by evaporation therefrom, the adhesive setting immediately.

In using the ammoniacal solution of polymeric styrene-maleamic acid alone or admixed with a supplementary adhesive material and/or a finely divided carrier for producting laminated fibreboard, the solution may be applied at the rate of about 1.5 to 5.0 pounds per thousand sq. feet of glue line. Larger amounts may be used under particular circumstances but ordinarily will not be found necessary or desirable. Smaller amounts while suitable under certain circumstances are ordinarily inadequate to give a bond of maximum strength.

The prepared adhesive solution of this invention are smooth, viscous liquids with considerable tack. They are easy to handle and exhibit a satisfactory degree of stability. They are compatible with borated starch, have improved tack and set time as well as excellent resealing properties.

The compositions of my invention are applicable in any use where two or more objects are to be adhesively joined. They are well suited for use in the solid fiber industry and are particularly useful in the manufacture of electrical appliance boards. The compositions are also exceedingly well-adapted for bonding lightly-waxed kraft paper in the manufacture of convolute wound paper shipping drums. They also give excellent results in bonding paper which must withstand contact with hot liquids as for example hot drink cups.

The finished adhesively-joined structures of this invention are characterized by their remarkable resistance to water, to outdoor exposures, and to extreme weather changes. A solid fiberboard made up of a lamination joined with adhesive compositions comprising polymeric ammonium styrene-maleamate will withstand prolonged soaking in water without showing ply separation.

The invention will be better understood by reference to the following illustrative examples:

Example 1

This example illustrates the preparation of a styrene-maleic anhydride copolymer and its subsequent ammoniation in accordance with a process of the invention.

Maleic anhydride (19.5 parts) is changed to a reaction kettle along with 230 parts of benzene. The air in the reactor is replaced by nitrogen and the nitrogen flow is allowed to continue throughout the polymerization process. The solution is heated to about 70° C. and purged well with nitrogen to expel water vapor. A stoichiometric proportion (21 parts) of styrene is then added giving a 15% solution of monomer (maleic anhydride plus styrene). The resulting mixture is heated to reflux temperature (80° C.). A catalyst consisting of benzoyl peroxide in an amount equivalent to 0.1% (0.04 part) of the monomer charged is dissolved in about 0.6 part of benzene and the resulting benzene solution is charged to the reactor. The reaction mixture is then maintained at reflux temperature (80–82° C.) for a period of about 90 minutes to complete the polymerization.

After cooling the reaction mixture to room temperature, approximately 110 parts of benzene is decanted therefrom with a vacuum filter-stick. Fresh benzene (145 parts) is then charged and the mixture is reslurried with benzene. The benzene slurry is transferred to a filter nutsch and is pulled dry. The wet polymer is then placed in trays and dried in the open air for a period of about 48 hours. The polymer is further dried in a room thermally-controlled at a temperature of 50° C. The dry powder is finally blended for about 30 minutes in a ribbon blender and made ready for ammoniation.

The styrene-maleic anhydride copolymer thus prepared has an absolute viscosity of about 3000 centipoises, measured immediately after its preparation as a 15% solution in methyl ethyl ketone at 25° C.

The dry copolymer is then dissolved in an aqueous solution of ammonia in which the ammonia ($NH_3$) concentration is about 3%, the solution containing ammonia in an amount at least 1.1 times the amount theoretically required for formation of the full ammonium salt. The ammoniacal solution is heated at a temperature of about 180° F. for a period sufficient to dispel excess ammonia. The solution, which comprises in main polymeric styrene-maleamic acid and its ammonium salt, is then cooled. The adhesive composition thus prepared is adjusted to a solids content of 15%, and can be used in preparing multi-ply solid fiber box board, but is preferably compounded with a finely divided carrier and/or an auxiliary adhesive.

Example 2

A styrene-maleic anhydride copolymer is prepared as described in Example 1. The resulting slurry of about 262 parts of the copolymer in 2360 parts of benzene is cooled from the polymerization temperature to about 25° C. About 200 parts additional benzene is added to make possible better agitation, and 139 parts of anhydrous ammonia is bubbled through the slurry at a temperature of 25–30° C. over a two hour period. The product is filtered and air dried in a hood for a period of about 6 days. The yield is 312 parts of white polymeric ammonium styrene-maleamate containing 7.7% nitrogen.

The polymer thus prepared can be dissolved directly in water, adjusted to a solids content of 15% and used in preparing multi-ply solid fiber box board, but is preferably compounded with a finely divided carrier and/or an auxiliary adhesive.

Example 3

Thirty-five parts of polyvinyl alcohol as a 10% solution, 5 parts of polymeric ammonium styrene-maleamate as a 15% solution, and 60 parts of precipitated calcium carbonate are thoroughly mixed to give 444.4 parts of an adhesive composition containing 22.5% solids.

The composition so produced gives an excellent water resistant bond on highly sized kraft paper.

Example 4

Forty-four parts of polymeric ammonium styrene-maleamate as 15% solution are mixed with 56 parts of precipiated calcium carbonate and 97 parts of water to give 444.4 parts of an adhesive composition containing 22.5% solids.

The resulting composition gives an excellent water resistant bond on asphalt impregnated filler stock used for making laminated fiberboard.

Example 5

Ten parts of polymeric ammonium styrene-maleamate as 15% solution prepared as in Example 1 are mixed with 90 parts of polyvinyl alcohol as 10% solution.

The composition thus obtained gives good water resistant bonds on asphalt impregnated filler stock used for making laminated fiberboard.

I claim:

1. A multi-ply structure comprising a plurality of cellulosic plies united with an adhesive consisting essentially of the product resulting from the drying down in situ, of an aqueous dispersion comprising a polymer selected from the group consisting of polymeric ammonium styrene-maleamate and polymeric styrene-maleamic acid, said polymer having an absolute viscosity when dispersed in water to give a 15% solids content, of at least 4700 centipoises but not exceeding 10,000 centipoises measured at 25° C.

2. A method for producing weatherproof joined structures which comprises effecting a bond between at least two solid surfaces with a composition comprising a polymer selected from the group consisting of polymeric ammonium styrene-maleamate and polymeric styrene-maleamic acid, said polymer having an absolute viscosity, when dispersed in water and adjusted to pH 7.8 with ammonia to give a 15% solids content, of at least 4700 centipoises but not exceeding 10,000 centipoises measured at 25° C.

3. A composition comprising polyvinyl alcohol and a polymer selected from the group consisting of polymeric ammonium styrene-maleamate and polymeric styrene-maleamic acid, said polymer having an absolute viscosity, when dispersed in water and adjusted to pH 7.8 with ammonia to give a 15% solids content, of at least 4700 centipoises but not exceeding 10,000 centipoises measured at 25° C.

References Cited in the file of this patent

UNITED STATES PATENTS

| Number | Name | Date |
| --- | --- | --- |
| 1,976,679 | Fikentscher et al. | Oct. 9, 1934 |
| 2,419,880 | Blyler et al. | Apr. 29, 1947 |
| 2,456,177 | Cupery | Dec. 14, 1948 |
| 2,504,003 | Cupery | Apr. 11, 1950 |